(12) United States Patent
Le Ouay

(10) Patent No.: US 7,019,742 B2
(45) Date of Patent: Mar. 28, 2006

(54) DYNAMIC 2D IMPOSTERS OF 3D GRAPHIC OBJECTS

(75) Inventor: Franck Le Ouay, Aachen (DE)

(73) Assignee: Microsoft Corporation, Redmond, WA (US)

( * ) Notice: Subject to any disclaimer, the term of this patent is extended or adjusted under 35 U.S.C. 154(b) by 314 days.

(21) Appl. No.: 10/718,427

(22) Filed: Nov. 20, 2003

(65) Prior Publication Data

US 2005/0110789 A1    May 26, 2005

(51) Int. Cl.
*G06T 17/00* (2006.01)
(52) U.S. Cl. .................................. 345/419; 345/427
(58) Field of Classification Search ................ 345/418, 345/419, 427, 428, 581
See application file for complete search history.

(56) References Cited

U.S. PATENT DOCUMENTS

| | | | |
|---|---|---|---|
| 6,226,000 B1* | 5/2001 | Richens et al. ............. | 345/419 |
| 2003/0120391 A1* | 6/2003 | Saito .......................... | 700/264 |
| 2004/0141014 A1* | 7/2004 | Kamiwada et al. ......... | 345/848 |
| 2005/0035980 A1* | 2/2005 | Lonsing ...................... | 345/633 |

OTHER PUBLICATIONS

Aubel, A., R. Boulic, D. Thalmann. 1998. "Animated Impostors for Real-time Display of Numerous Virtual Humans." *Proc. Virtual Worlds* (Jul.): 1-10.
1999. Lowering the Cost of Virtual Human Rendering With Structured Animated Impostors. *Proc. WSCG* (Feb.): 8pp.
2000. "Real-time Display of Virtual Humans: Levels of Detail and Impostors." *IEEE Transactions on circuits and Systems for Video Technology.* pp 1-25.
Chang, Chun-Fa, Gary Bishop, Anselmo Lastra. 1999. "LDI Tree: A Hierarchical Representation for Image-Based Rendering." In the Proceedings of *SIGGRAPH:* 291-298.
Hoff III, Kenneth E. et al. "Environment-Mapped Cell Texture Representations to Alleviate "Popping" and Facilitate Paging." nd. Available at http://www.cs.unc.edu/~hoff/research/walkthru/popping_pres/slide0.html.

(Continued)

*Primary Examiner*—Matthew C. Bella
*Assistant Examiner*—Cliff N Vo
(74) *Attorney, Agent, or Firm*—Ronald M. Anderson

(57) ABSTRACT

2D imposters representing 3D graphical objects, such as virtual spectators in a simulated sports arena, are dynamically displayed at predefined locations relative to an arbitrarily movable camera position in a virtual space. A hierarchical data structure is created with branches corresponding to iteratively subdivided groups of imposter data structures and is used to store polygon vertices, texture data, and other 2D imposter data generated during run-time. Center locations of the hierarchically divided groupings are used to determine a common projection location within a current view volume at which each 2D imposter is projected as an oriented image from each corresponding animated 3D graphical object. Sets of contiguous 2D imposter data are determined based on currently visible groupings of predefined locations that do not require rendering as 3D graphical objects due to their distance from the camera position. Each set of contiguous 2D imposters is rendered with a single draw primitive.

20 Claims, 11 Drawing Sheets

OTHER PUBLICATIONS

Maciel, Paulo W.C. and Peter Shirley. 1995. "Visual Navigation of Large Environments Using Textured Clusters." Symposium on Interactive 3D Graphics (Apr.): 95-102, 211.

Oliveira, Manual M. and Gary Bishop. 1999. "Image-Based Objects." In the proceedings of ACM Symposium on Interactive 3D Graphics. (Apr.): 9pp.

Rotenberg, Steve. 2003. CSE 191A: Seminar on Video Game Programming. "Lecture2: Scene Management." 26pp of slide reproductions.

Schaufler, Gernot. 1995. "Dynamically Generated Impostors." *MVD Workshop* (Nov.): 129-136.

Schaufler, Gernot and Wolfgang Sturzlinger. 1996. "A Three Dimensional Image Cache for Virtual Reality." In the proceedings of EUROGRAPHICS. (Aug.):11pp.

Shade, Jonathan et al. 1996. "Hierarchical Image Caching for Accelerated Walkthroughs of Complex Environments." In the proceedings of SIGGRAPH: 8pp.

Sillion, Francois, Georges Drettakis, Benoit Bodelet. 1997. "Efficient Imposter Manipulation for Real-Time Visualization of Urban Scenery." In the proceedings of EUROGRAPHICS. (Sep.):16:3, 12pp.

Tecchia, Franco, Celine Loscos, Yiorgos Chrysanthou. 2002. "Image-Based Crowd Rendering." *Computer Graphics*. 7pp.

\* cited by examiner

DYNAMIC 2D IMPOSTERS OF 3D GRAPHIC OBJECTS

FIELD OF THE INVENTION

The present invention generally relates to dynamically creating and updating two-dimensional (2D) imposters of three-dimensional (3D) graphic objects, and more specifically, pertains to generating 2D imposters at a common projection point and rendering a large number of 2D imposters using minimal drawing primitive functions.

BACKGROUND OF THE INVENTION

Realistically rendering crowds, vegetation, and other animated background objects has always been a difficult problem in video games. For realism, one must render a large number of models with substantial variety in motion and textures. However, a crowd or other background is usually not the main focus of a scene, so given the limitations on processing power, only a limited amount of the available processing power can be dedicated to rendering the background in a scene.

Rendering an entire crowd in 3D would be prohibitive with current hardware. Instead, most games use a relatively crude technique to render a crowd, in which a set of crowd members are pre-rendered and stored in a bank of textures. At run-time, the game simply applies theses textures on rows of rectangles. Just like in cartoons, the impression of motion is given by rapidly switching from one texture to another. This technique is fast, but is quite memory consuming. The game must store a texture for each crowd member, for each frame in every animation. The other drawback of this technique is that it only looks realistic so long as the view point (or camera) is sufficiently far from the polygons representing the crowd and remains perpendicular to them. As soon as the view point or camera gets too close, the illusion is broken, because the eye readily perceives the "flat" aspect of the polygons used to render the crowd.

A technique for disguising the flat appearance of a background employs a pair of orthogonal polygons for each object. In this way, a changing image is visible as the view point or camera moves around the orthogonal polygons. However, if the camera moves above or below the orthogonal polygons, the edges of the polygons are visible, which destroys the realism.

Another current technique uses images taken from multiple 3D directions of an individual 3D model; each such image is stored as a texture. The texture that most closely matches the current camera angle is then rendered. However, this technique requires a large amount of storage for storing multiple textures of multiple 3D models. Even more storage is required if each model is depicted in a number of animated positions, because each position requires multiple textures for the multiple directions.

A fundamental problem with these prior art techniques is that they treat each object individually. Each polygon and/or texture must be recomputed relative to a new view point or camera position during each image frame. This computation requires excessive processor cycles although each view point involves only a slightly different angle for each polygon. Although, computing the perfect angle for each polygon is accurate, such precision is not required for backgrounds. Instead, it is preferable to treat a large number of similar objects together so as to reduce processor cycles and memory requirements. Current techniques are simply not able to provide realistic backgrounds in a scene without requiring unavailable processing power and/or excessive memory to store pre-rendered elements.

SUMMARY OF THE INVENTION

The present invention is directed to a method and system for dynamically displaying 2D imposters of 3D graphical objects relative to an arbitrarily movable camera position. Each 2D imposter comprises a projection of one of the 3D graphical objects and is duplicated throughout a virtual space, along with 2D imposters of the other 3D graphical objects, minimizing processor time and memory, yet providing sufficient variety to provide a realistic animated background. Locations are predefined within the virtual space at which a 2D imposter or a 3D graphical object will be rendered during run-time, depending on each location's proximity to a current camera position. These predefined locations are iteratively divided into hierarchical groupings that include substantially equal numbers of adjacent predefined locations. Associated with each predefined location is an imposter data structure that defines a 2D imposter. Each imposter data structure comprises vertex data elements that define a polygon onto which texture data of the 2D imposter will be rendered. The imposter data structures are arranged in a contiguous quad order and are associated with each hierarchical group to which the corresponding predefined locations belong. Thus, a hierarchical data structure is created as a tree whose branches correspond to hierarchically subdivided groups of imposter data structures that are used to store data generated during run-time for 2D imposters.

During run-time, when a current camera position and view volume is determined, the tree is used to create or update 2D imposters from the 3D graphical objects. The hierarchical groupings are used to determine a common projection location within the view volume at which each 2D imposter is generated from each corresponding 3D graphical object. More specifically, the common projection location is determined as a weighted average of center coordinates determined for each grouping of predefined locations that is within a modulated distance of the current camera position relative to a centroid of the view volume. The modulated distance is determined as a function of a current zoom factor and other factors. Preferably, a current animation of each 3D graphical object is also determined, so that the current pose of each 3D graphical object can be projected at the common projection location to generate the corresponding 2D imposters.

Once the 2D imposters are created or updated, they are rendered at appropriate predefined locations. However, to improve rendering efficiency, 2D imposters are rendered in sets, using a single draw primitive to render a lot of 2D imposters as one texture for each set. Sets comprise contiguous groupings of predefined locations and corresponding imposter data. To determine the sets, the hierarchical groupings are first evaluated relative to the current view volume to determine the groupings that have at least one predefined location, which is visible to the camera. These visible groupings are evaluated to determine which are within a modulated distance of the current camera position and should be rendered with 3D graphical objects. This modulated distance is also preferable determined as a function of the zoom factor and other factors. The visible groupings that will be rendered with 3D graphical objects represent a discontinuity in the visible groupings. Thus, a set of 2D imposters that will be rendered with a single draw primitive comprises contiguous visible groupings between non-visible groupings and/or a grouping of 3D graphical objects. Once the sets of 2D imposters are determined, they are preferably sorted in order from the set closest to the current camera position to the set farthest from the current camera position. Preferably, the closer 3D graphical objects are rendered prior to even the closest set of 2D imposters to prevent rendering pixels of 2D imposters that are blocked by the 3D graphical objects in front of the 2D imposters, thereby increasing rendering speed. Once the 3D graphical objects are rendered, each set of 2D imposters is rendered with a single draw primitive. As the camera position changes in successive execution frames, the transition between 3D graphical objects and 2D imposters also changes dynamically. Thus, highly realistic 3D graphical objects are always rendered at the predefined locations that are currently closest to a user's current view point, and sets of 2D imposters are always rendered at the predefined locations that are currently beyond the 3D graphical objects.

Another aspect of the invention is directed to a memory medium that stores machine instructions for carrying out the steps described above and in accord with the present invention, as discussed in further detail below.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

Figure 11:
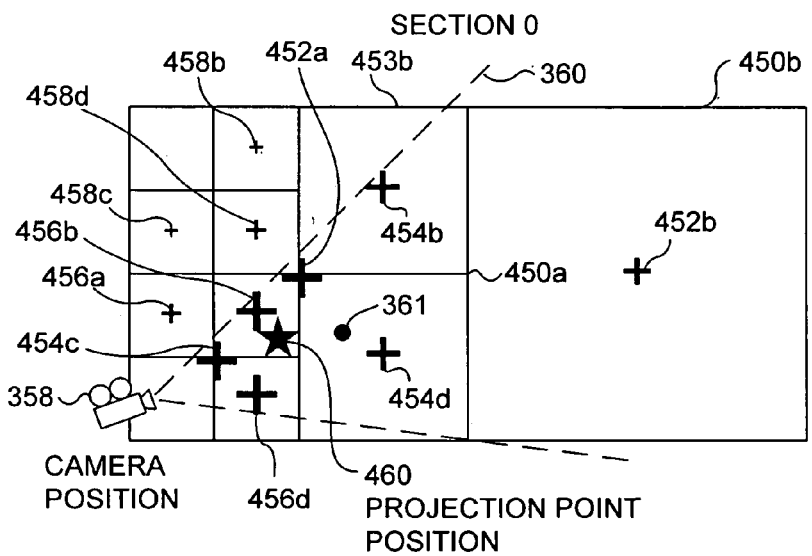
Figure 12:
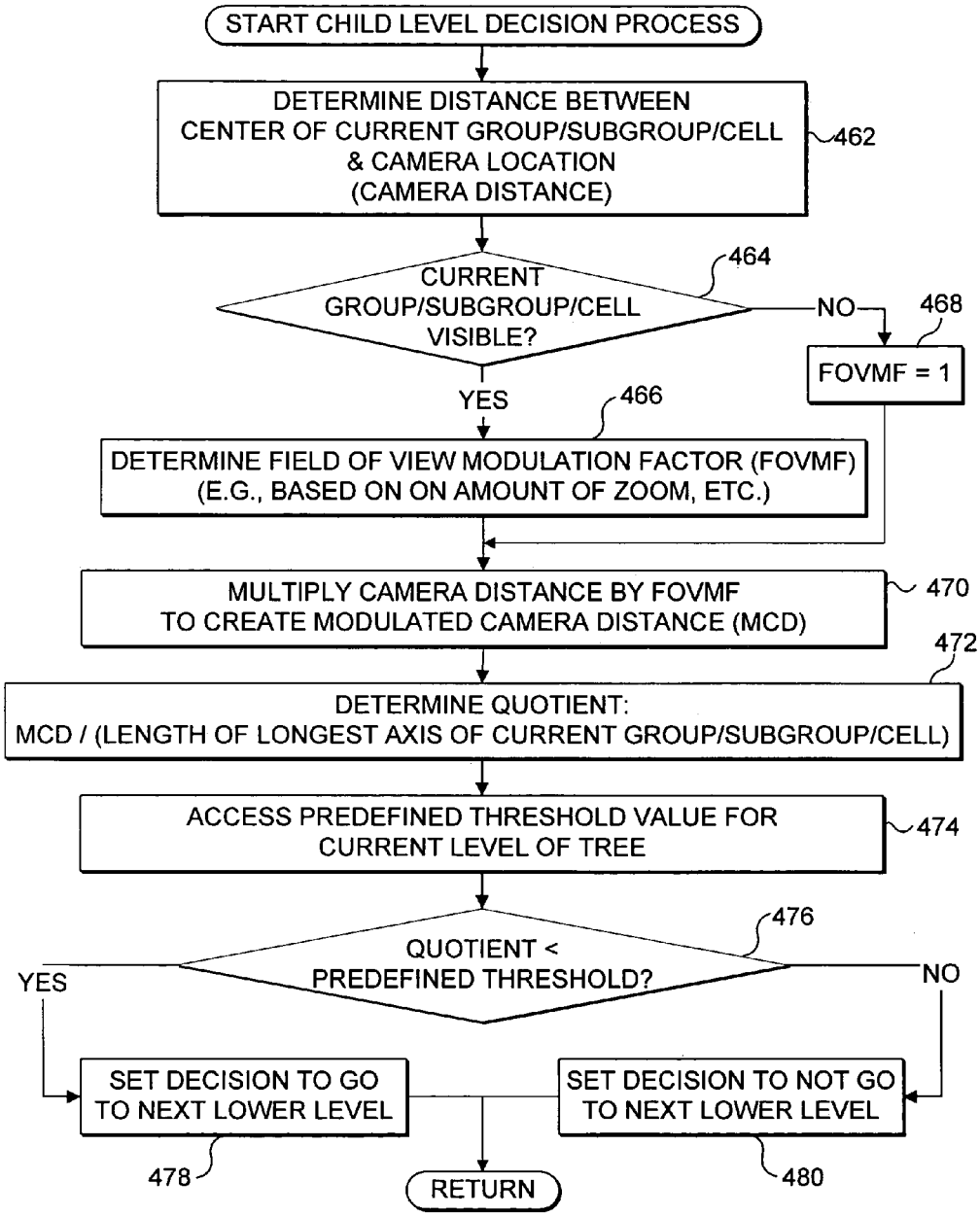
Figure 13:
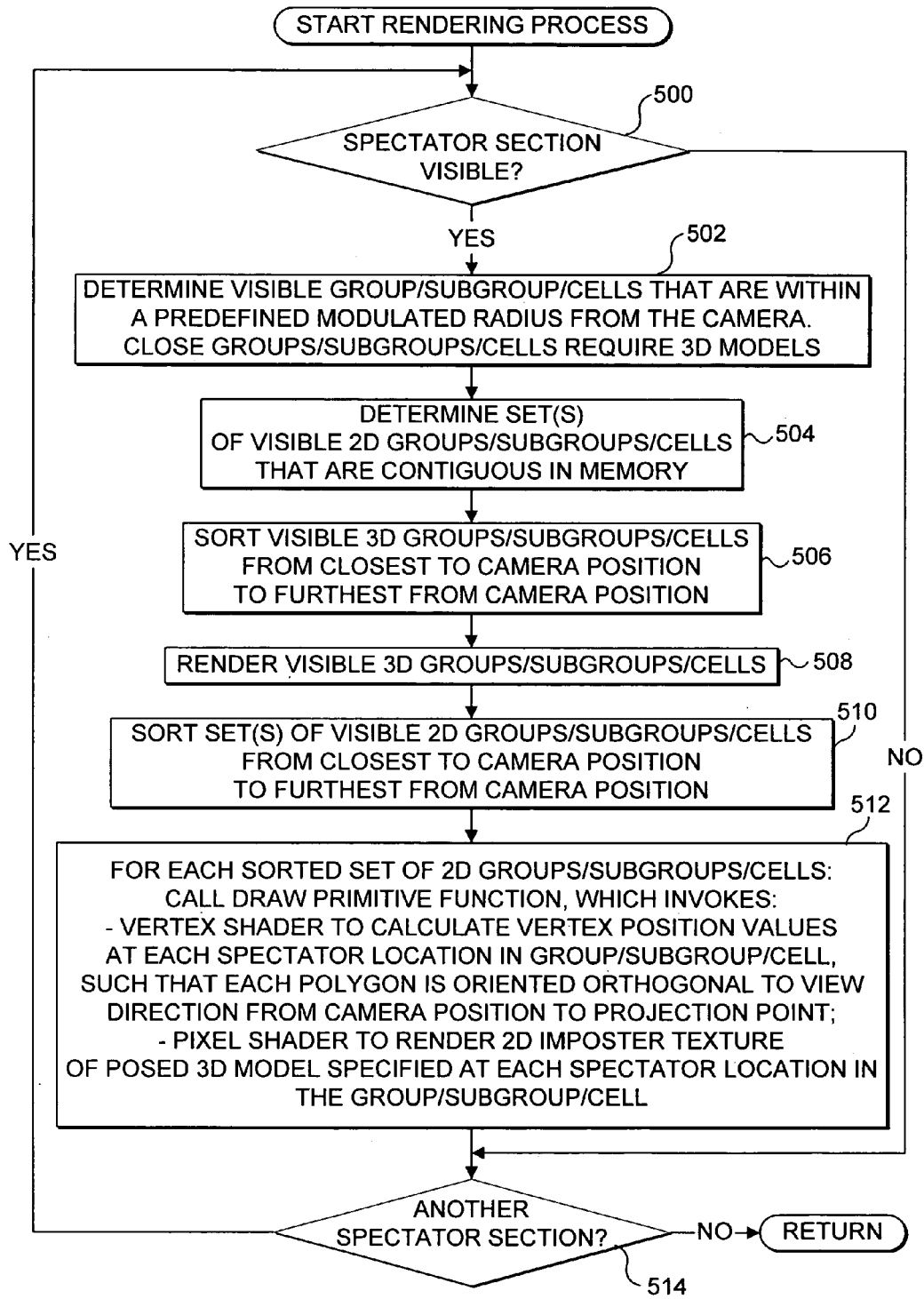

FIG. 11 provides a graphical example for determining the projection point position;

FIG. 12 is a flow diagram illustrating logic for determining whether to evaluate a next lower level of groupings to determine more centers and corresponding PPMFs, used in determining the projection point; and FIG. 13 is a flow diagram illustrating logic for rendering the 3D models and 2D imposters of the visible spectator sections.

DESCRIPTION OF THE PREFERRED EMBODIMENT

A preferred embodiment of the present invention is described below in regard to an exemplary use in providing a simulated crowd of spectators for an electronic gaming system that is designed to execute gaming software in coordination with a network gaming service. Those skilled in the art will recognize that the present invention may also be implemented for displaying 2D imposters of other graphical objects such as terrain objects, structures, vegetation objects, almost any type of objects that are not the primary focus of a display scene. It is also emphasized that the present invention can be practiced on a variety of computing machines such as a personal computer (PC), a set-top box, an arcade game, a hand-held device, and other related systems that display a virtual environment having a background.

Exemplary Operating Environment

Figure 1:
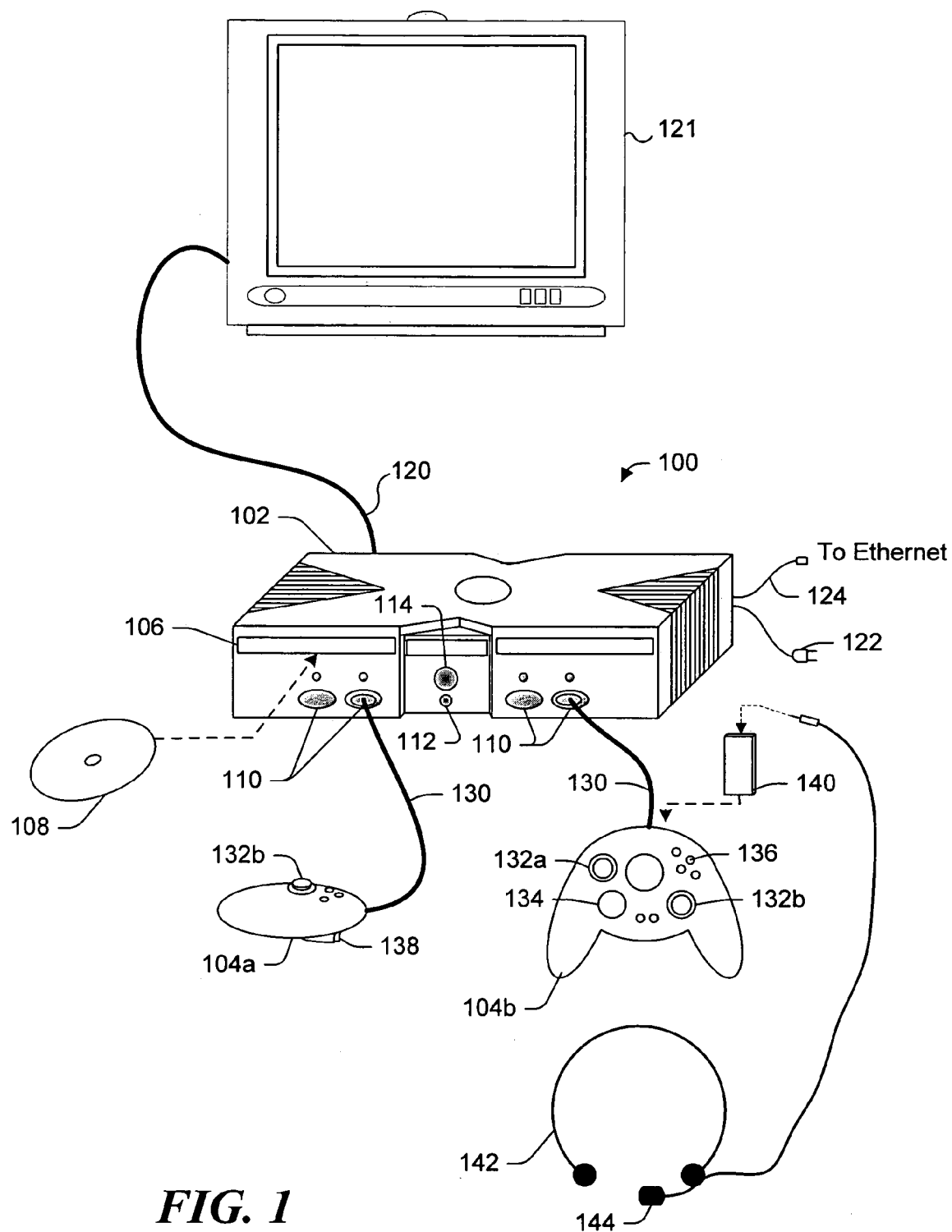
FIG. 1 illustrates an exemplary electronic gaming system that includes a game console and support for up to four user input devices.

As shown in FIG. 1, an exemplary electronic gaming system 100 that is suitable for practicing the present invention includes a game console 102 and support for up to four user input devices, such as controllers 104a and 104b. Game console 102 is equipped with an internal hard disk drive (not shown in this Figure) and an optical media drive 106 that reads various forms of portable optical storage media, as represented by an optical storage disc 108. Examples of suitable portable storage media include digital versatile discs (DVDs) and compact disc-read only memory discs (CD-ROMs). In this gaming system, game programs are preferably distributed for use with the game console on DVD discs, but it is also contemplated that other storage media might instead be used on this or other types of systems that employ the present invention.

On a front face of game console 102 are four slots 110 for connection to supported controllers, although the number and arrangement of the slots may be modified as needed to support more or fewer controllers. A power button 112 and an eject button 114 are also positioned on the front face of game console 102. Power button 112 controls application of electrical power to the game console, and eject button 114 alternately opens and closes a tray (not shown) of optical media drive 106 to enable insertion and extraction of storage disk 108, so that the digital data on it can be read for use by the game console.

Game console 102 connects to a television 121 or other display, monitor, or screen via audio/visual (A/V) interface cables 120. A power cable plug 122 conveys electrical power to the game console when connected to a conventional alternating current line source (not shown). Game console 102 includes an Ethernet data connector 124 to transfer and receive data over a network (such as through a connection to a hub or a switch (not shown), or over the Internet, for example, through a connection to an xDSL interface, a cable modem, or other broadband interface (not shown). Other types of game consoles that implement the present invention may be coupled together or to a remote server, by communicating using a conventional telephone modem.

Each controller 104a and 104b is coupled to game console 102 via a lead (or alternatively through a wireless interface). In the illustrated implementation, the controllers are USB compatible and are connected to game console 102 via USB cables 130; however, it is contemplated that other types of data interfaces may instead be employed. Game console 102 may be equipped with any of a wide variety of user devices for interacting with and controlling the game software. As illustrated in FIG. 1, each controller 104a and 104b is equipped with two thumbsticks 132a and 132b, a D-pad 134, buttons 136, and two triggers 138. These controllers are merely representative, and other gaming input and control devices may be substituted for or added to those shown in FIG. 1 for use with game console 102.

A removable function unit 140 can optionally be inserted into each controller 104a and 104b to provide additional features and functions. For example, a portable memory unit (MU) enables users to store game parameters and port them for play on other game consoles, by inserting the portable MU into a controller connected to the other game console. Another removable functional unit comprises a voice communication unit that enables a user to verbally communicate with other users locally and/or over a network. Connected to the voice communication unit is a headset 142, which includes a boom microphone 144. The circuitry of the voice communication unit may alternatively be integrated into the controller, and a headset with boom microphone may be removably or permanently connected to the controller. Preferably, each controller is configured to accommodate two removable function units, although more or fewer than two removable function units or modules may instead be employed.

Gaming system 100 is capable of playing, for example, games, music, and videos. It is contemplated that other functions can be implemented using digital data stored on the hard disk drive or read from optical storage disc 108 in drive 106, or using digital data obtained from an online source, or from a MU. For example, gaming system 100 is capable of playing:

Game titles stored on CD and DVD discs read by the optical media drive, stored on the hard disk drive, or downloaded from an online source;

Digital music stored on a CD read by optical media drive 106, in a file on the hard disk drive (e.g., WINDOWS MEDIA AUDIO™ (WMA) format), or derived from online streaming sources on the Internet or other network; and Digital A/V data stored on a DVD disc read by optical media drive 106, or in files stored on the hard disk drive (e.g., in an Active Streaming Format), or accessed from online streaming sources over the Internet or other network.

Figure 2:
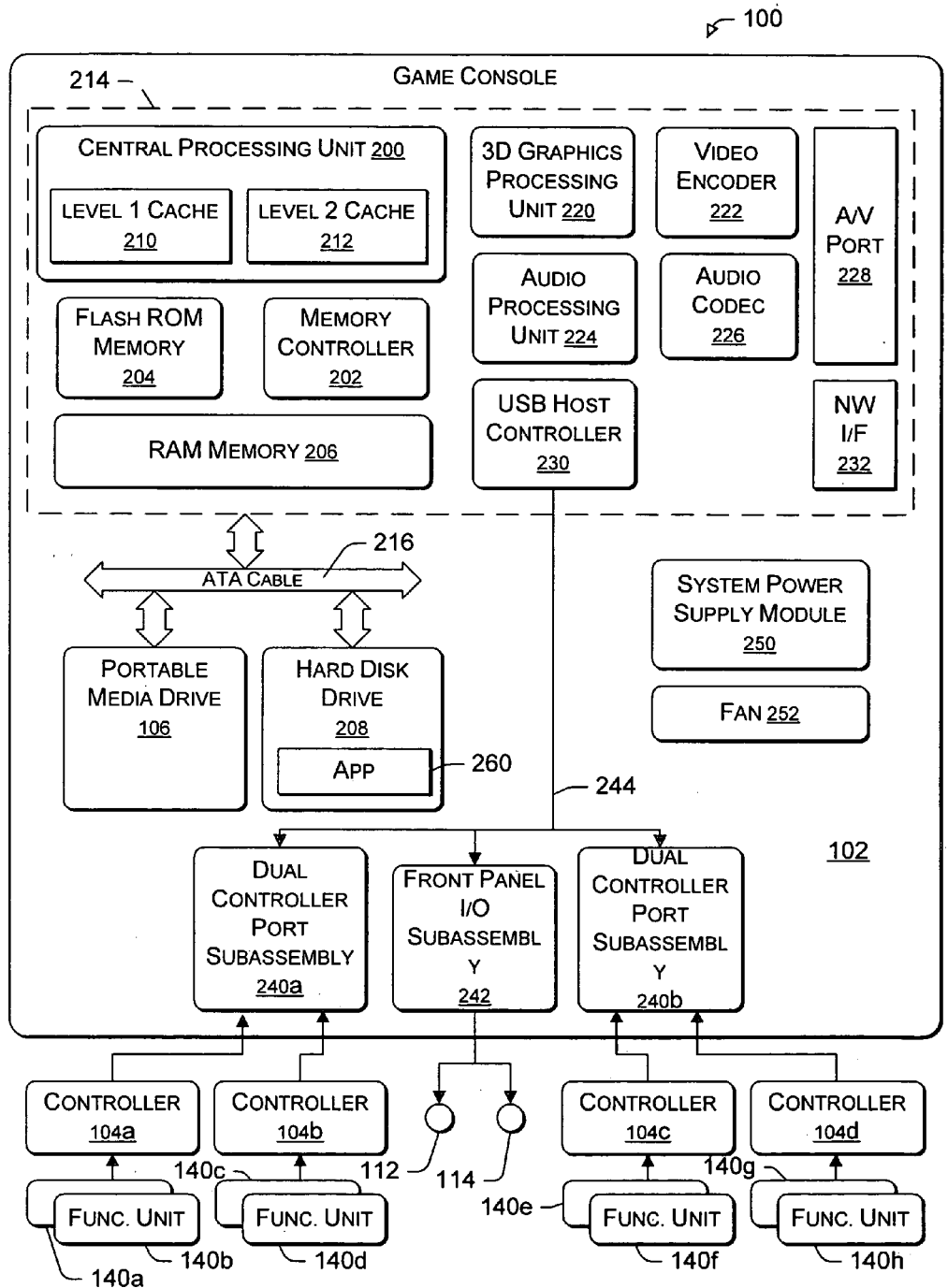
FIG. 2 is a functional block diagram showing components of the gaming system of FIG. 1 in greater detail.

FIG. 2 shows functional components of gaming system 100 in greater detail. Game console 102 includes a CPU 200, a memory controller 202 that facilitates CPU access to a read-only memory (ROM) 204, a random access memory (RAM) 206, a hard disk drive 208, and portable optical media drive 106. CPU 200 is equipped with a level 1 cache 210 and a level 2 cache 212 to temporarily store data so as to reduce the number of memory access cycles required, thereby improving processing speed and throughput of the gaming system. CPU 200, memory controller 202, and various memory devices are interconnected via one or more buses, including serial and parallel buses, a memory bus, a peripheral bus, and a processor or local bus using any of a variety of bus architectures. By way of example, such architectures can include an Industry Standard Architecture (ISA) bus, a micro channel architecture (MCA) bus, an enhanced ISA (EISA) bus, a Video Electronics Standards Association (VESA) local bus, and a peripheral component interconnect (PCI) bus.

As an example of one suitable implementation, CPU 200, memory controller 202, ROM 204, and RAM 206 are integrated onto a common module 214. In this implementation, ROM 204 is configured as a flash ROM that is connected to memory controller 202 via a PCI bus and a ROM bus (neither of which are shown). RAM 206 is configured as multiple double data rate synchronous dynamic RAM modules (DDR SDRAM modules) that are independently controlled by memory controller 202 via separate buses (not shown). Hard disk drive 208 and optical media drive 106 are connected to the memory controller via the PCI bus and an advanced technology attachment (ATA) bus 216.

A 3D graphics processing unit (GPU) 220 and a video encoder 222 form a video processing pipeline for high-speed and high-resolution graphics processing. Data are conveyed from GPU 220 to video encoder 222 via a digital video bus (not shown). An audio processing unit 224 and an audio encoder/decoder (CODEC) 226 form a corresponding audio processing pipeline for high fidelity and stereo audio data processing. Audio data are conveyed between audio processing unit 224 and audio CODEC 226 via a communication link (not shown). The video and audio processing pipelines output data to an A/V port 228 for transmission to the television or other display monitor. In the illustrated implementation, video and audio processing components 220–228 are mounted on module 214.

Also implemented on module 214 are a USB host controller 230 and a network interface 232. USB host controller 230 is coupled to CPU 200 and memory controller 202 via a bus (e.g., the PCI bus), and serves as a host for peripheral game controllers 104a–104d. Network interface 232 provides access to a network (e.g., the Internet, home network, etc.) and may include any of a wide variety of various wire or wireless interface components, including an Ethernet card, a telephone modem interface, a Bluetooth module, a cable modem interface, an xDSL interface, and the like.

Game console 102 has two dual controller support subassemblies 240a and 240b, and each subassembly supports two of game controllers 104a–104d. A front panel input/output (I/O) subassembly 242 supports the functionality of power button 112 and eject button 114, as well as any light emitting diodes (LEDs) or other indicators exposed on the outer surface of the game console. Subassemblies 240a, 240b, and 242 are coupled to module 214 via one or more cable assemblies 244.

Eight function units 140a–140h are illustrated as being connectable to four controllers 104a–104d, i.e., two function units for each controller. Each function unit offers additional functionality or storage for games, game parameters, and other data. When an MU is inserted into a controller, the MU can be accessed by memory controller 202.

A system power supply module 250 provides power to the components of gaming system 100. A fan 252 cools the components and circuitry within game console 102.

To implement the present invention, a game software application 260 comprising machine instructions stored on a DVD or other storage media (or downloaded over the network) is loaded into RAM 206 and/or caches 210 and/or 212 for execution by CPU 200. Portions of software application 260 may be loaded into RAM only when needed, or all of the software application (depending on its size) may be loaded into RAM 206. Software application 260 and the relevant functions that it performs to implement the present invention are described below in greater detail.

Gaming system 100 may be operated as a stand-alone system by simply connecting the system to a television or other display monitor. In this stand-alone mode, gaming system 100 enables one or more users to play games, watch movies, or listen to music. However, with connectivity to the Internet or other network, which is made available through network interface 232, gaming system 100 may be further operated as a component of a larger network gaming community, to enable online multiplayer interaction in games that are played over the Internet or other network with players using other gaming systems. Gaming system 100 can also be coupled in peer-to-peer communication with another gaming system using the network interface and an appropriate cable (not shown).

Figure 3:
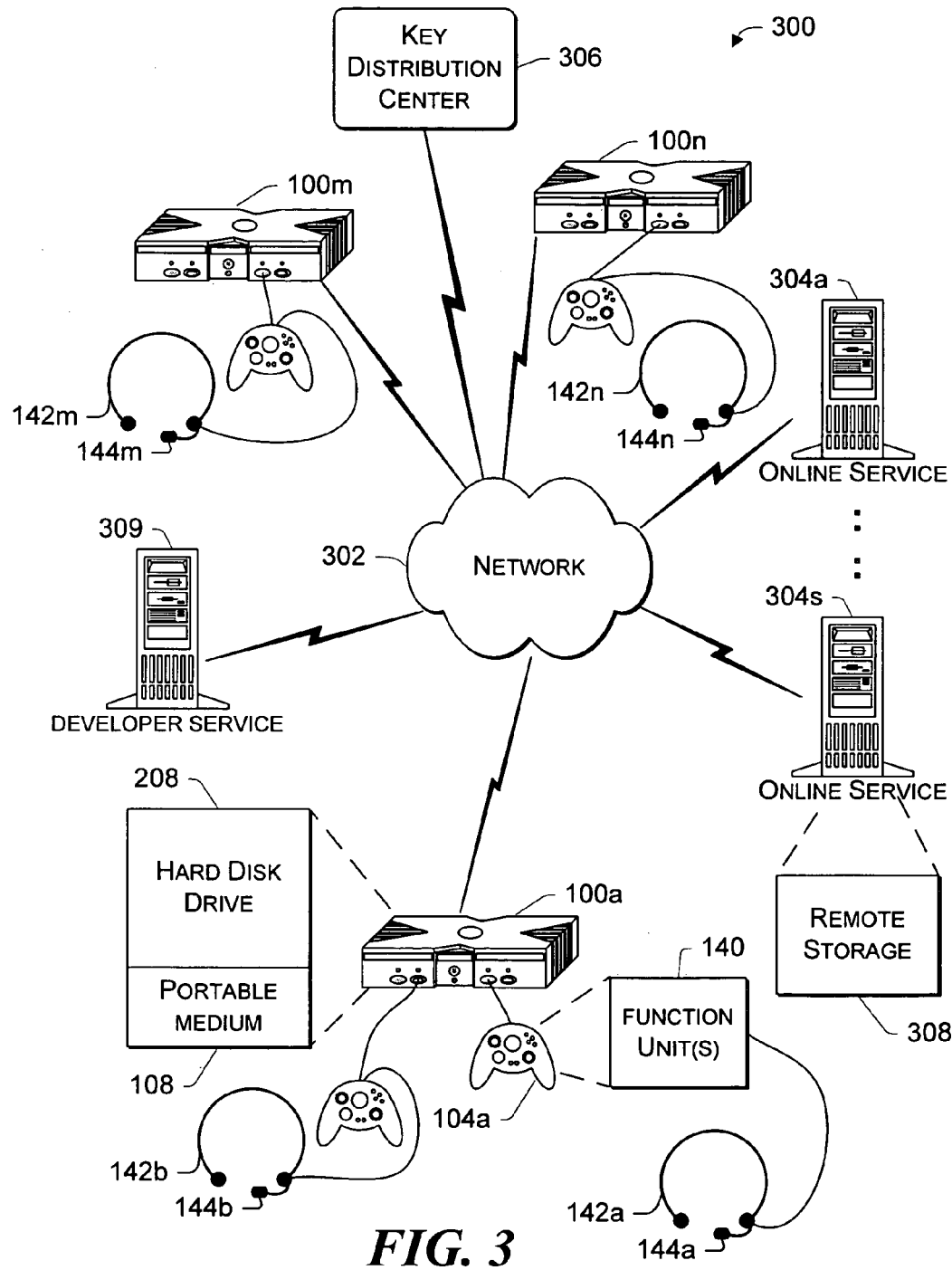
FIG. 3 is a schematic diagram showing an exemplary network gaming environment that interconnects multiple gaming systems like that shown in FIGS. 1 and 2 over a network.

Network System FIG. 3 shows an exemplary network gaming environment 300 that interconnects multiple gaming systems 100a, . . . 100n via a network 302. Preferably, each gaming system includes at least one corresponding headset 142a, . . . 142n and corresponding microphone 144a, . . . 144n for voice communication between players. Network 302 represents any of a wide variety of data communication networks and may include public portions (e.g., the Internet), as well as private portions (e.g., a residential or commercial local area network (LAN)). Network 302 may be implemented using any one or more of a wide variety of conventional communication configurations, including both wired and wireless types. Any of a wide variety of communications protocols can be used to communicate data via network 302, including both public and proprietary protocols. Examples of such protocols include TCP/IP, IPX/SPX, NetBEUI, etc.

In addition to gaming systems 100a, . . . 100n, one or more online services 304a, . . . 304s are accessible via network 302 to provide various services for the participants, such as serving and/or hosting online games, serving downloadable music or video files, hosting gaming competitions, serving streaming A/V files, enabling exchange of email or other media communications, and the like. Network gaming environment 300 may further employ a key distribution center 306 that plays a role in authenticating individual players and/or gaming systems 100a, . . . 100n for interconnection to one another, as well as to online services 304a, . . . 304s. Distribution center 306 distributes keys and service tickets to valid subscribing participants that may then be used to form game playing groups of multiple players, or to purchase services from online services 304a, . . . 304s.

Network gaming environment 300 introduces another memory source available to individual gaming systems 100a, . . . 100n, i.e., online storage. In addition to accessing data on optical storage disk 108, hard disk drive 208, and function unit 140, gaming systems 100a, . . . 100n can also access data files available at remote storage locations via network 302, as exemplified by remote storage 308 at online service 304s.

Network gaming environment 300 further includes a developer service 309 with which developers can produce media effects, updated media data, game code, and other services. Such services can be distributed between the online services and the producers of games for the gaming systems, and between other devices within, and outside of network gaming environment 300. It should be noted that in a preferred form, the network gaming environment is a closed network, providing only access to other gaming systems and the gaming environment, using communication through virtual private network tunnels to provide enhanced security and preclude access by other computing devices.

Exemplary Process

Figure 4:
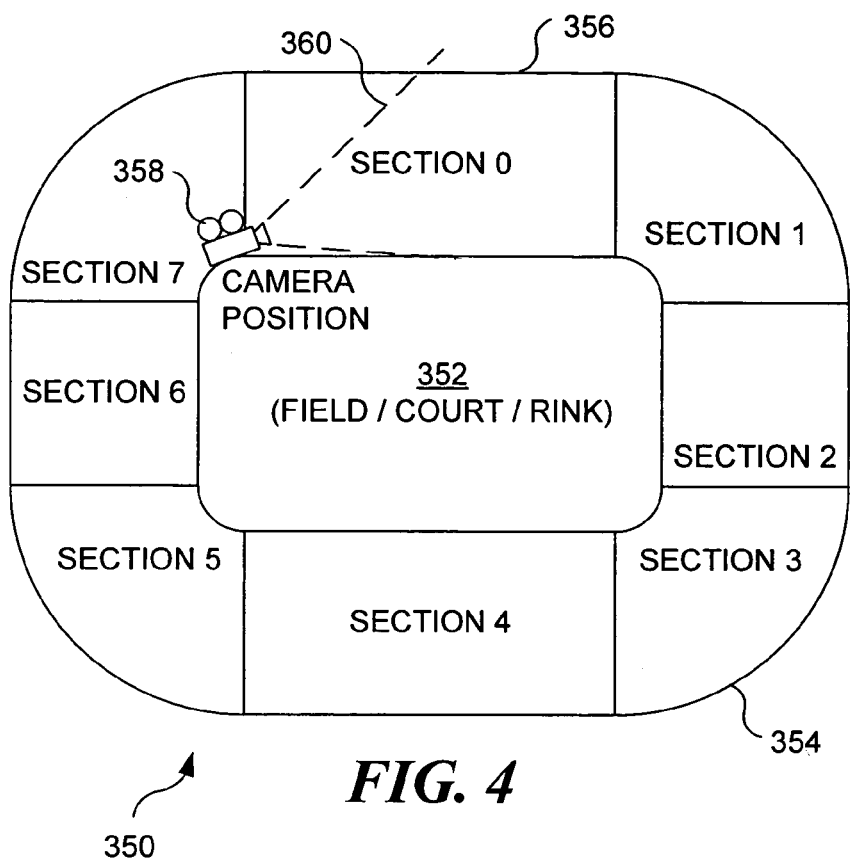
FIG. 4 illustrates a top view of an exemplary 3D virtual space comprising a simulated sports arena.

A preferred embodiment of the present invention is directed to a game or other simulation that includes a simulated crowd of spectators. FIG. 4 illustrates a top view of an exemplary 3D virtual space comprising a simulated sports arena 350. Sports arena 350 includes a play area 352 where simulated activities occur and is generally the focus of the 3D virtual space. Surrounding play area 352 is a spectator area 354, which is preferably divided into a number of sections. Although FIG. 4 shows a 2D view, those skilled in the art will recognize that each area represents a 3D volume in the virtual environment depicted. For example, spectator area 354, preferably represents a volume of tiered spectator seating. Each section comprises a number of virtual spectators that are all oriented to appear to be viewing play area 352. Preferably, a graphical artist predefines locations within each section at which virtual spectators are to be displayed. A large number of virtual spectators will typically be shown within each section to provide more realism for the computer game or other simulation.

However, realism must be balanced against memory and computing resource limitations. Because the virtual spectators are generally considered only background, very limited resources are allocated for displaying spectators relative to the resources allocated for computing and displaying primary activities within play area 352. For example, to run on a game console with limited capabilities, a game may allocate only 500 kB of memory to store all of the data needed for rendering all of the spectators in spectator area 354. In contrast, the game may allocate 16 MB of memory for computing and displaying activities that are the primary focus in play area 352. Nevertheless, a high level of realism can be obtained by using a combination of 3D models of virtual spectators and 2D imposters of the 3D models in accord with the present invention. Also, because the spectators are generally stationary within spectator area 354, groups of spectators can be processed together. Although the spectators are generally stationary, the spectators are preferably animated and depicted as moving their bodies in response to the activities occurring in play area 352. For example, some spectators are preferably animated to stand and cheer when a point is scored in play area 352. Also, a camera view preferably changes dynamically as a function of activities in play area 352 and also as a function of user input. Thus, dynamic updating of the spectators is desired to improve realism and enhance a user's experience with the game or other simulation.

To minimize the resources needed and ensure a minimum display frame rate, one section of spectators is preferably updated per display frame. For example, a section 0 356 can be updated within a frame as described in further detail below. For discussion purposes, a camera position 358 is disposed in a corner of section 0 356 and a view volume 360 extends from camera position 358 toward a central area of section 0 356. View volume 360 preferably comprises a frustum encompassing a desired view to be displayed.

Figure 5:
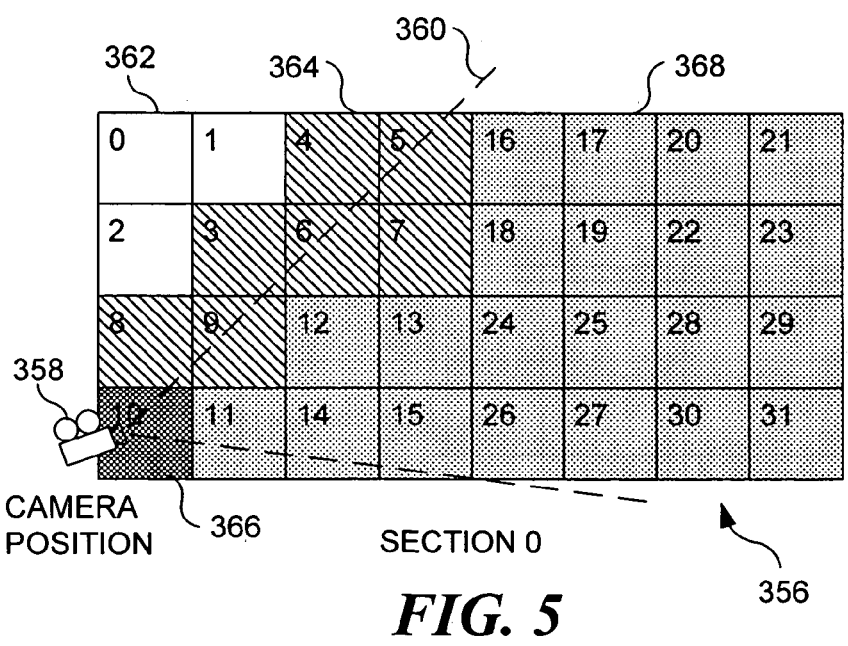
FIG. 5 illustrates how a spectator section is subdivided into a number of cells.

To improve the efficiency in updating a spectator section, the spectator section is hierarchically subdivided into a number of groupings, including groups, subgroups, and cells. FIG. 5 illustrates how section 0 356 is subdivided into a number of cells. Each cell comprises up to a maximum predefined number of spectator locations. For example, cell 0 362 can comprise approximately 20 spectator locations at which either 3D spectators or 2D imposters will be rendered. The cells are arranged in a hierarchical quad order such that each cell and grouping of cells are contiguous. By arranging the cells and groupings of cells in contiguous quad order, sets of cells can be rendered with a single draw primitive. For example, a set 364 (indicated by the diagonal lines in FIG. 5) can be rendered with 2D imposter spectators using a single draw primitive, because cells numbered 3 through 9 are contiguous under the hierarchical quad ordering.

However, the set ends when a next contiguous cell cannot be included. In the example illustrated in FIG. 5, a cell 10 366 cannot be included in set 364, because the spectator locations of cell 10 366 are disposed so close to camera position 358 that 3D spectators will be rendered in cell 10 366 rather than the 2D imposter spectators that will be rendered in the contiguous cells of set 364. Another set 368 of the remaining contiguous cells within (or intersecting) view volume 360 will be rendered with a single draw primitive to display 2D imposter spectators. Another interruption in contiguous cells' can result when a next cell lies completely outside of the view volume. In that case, none of the spectator positions of the outside cell are visible, so the outside cell is not included in the contiguous set, and no imposters need be rendered for the outside cell. Further details regarding the hierarchical structure, the contiguous sets, and the cells that will include 2D imposter spectators are discussed below.

Figure 6:
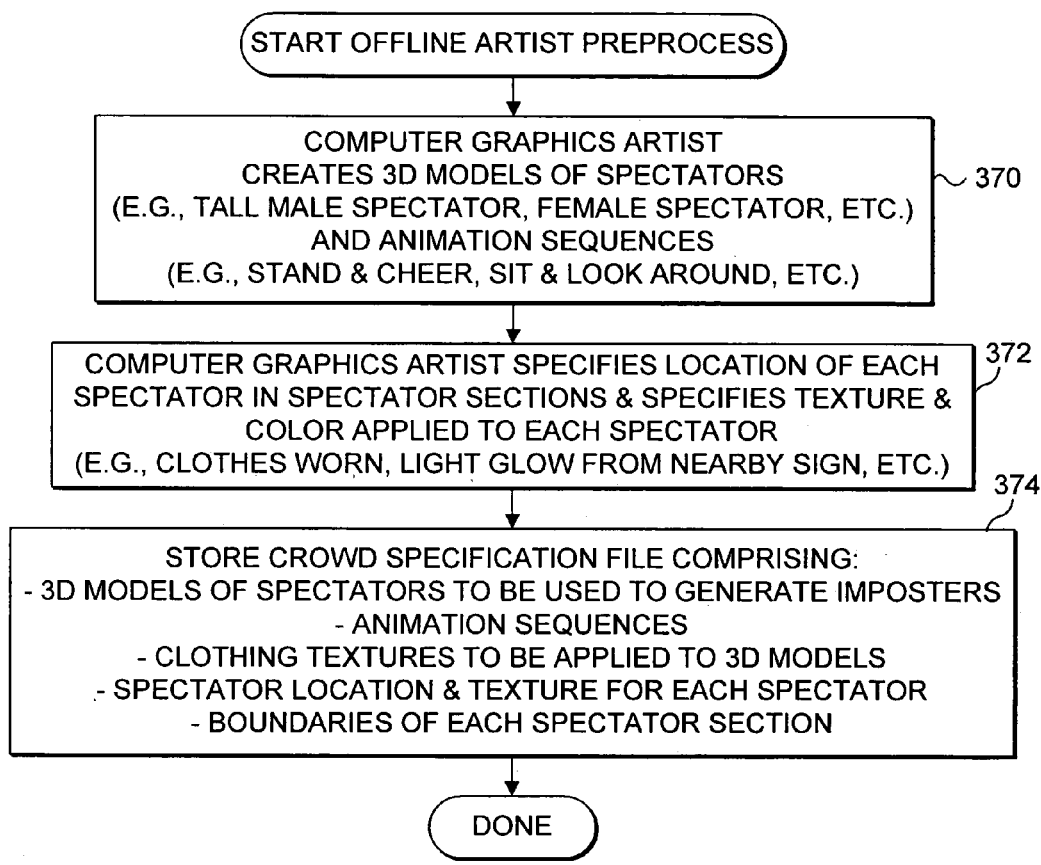
FIG. 6 is a flow diagram illustrating logic for an offline artist preprocess.

FIG. 6 is a flow diagram illustrating the logic for an offline artist preprocess that is initially implemented. At a step 370, a computer graphics artist creates 3D models of spectators and animation sequences for each of the 3D models. For example, the artist may create a number of different types of 3D models such as a tall male spectator, a female spectator, a child spectator, a concession vendor, and other types of crowd members. One of the 3D models will typically comprise an empty seat, but such an object still represents a spectator as that term is used herein. Each spectator can be assigned an animation type reflecting the type of animation that the spectator will perform. For example, a spectator may be specified as a home team supporter who stands and raises his arms over his head when each time that a point is scored by a home team player. Alternatively, a spectator may be specified as a visiting team supporter who makes gestures and appears to shout angrily when a point is scored by a home team player, but makes cheering gestures when the visiting team scores. The 3D models and animation sequences are preferably limited to a predefined number that is sufficiently large so that the animations do not appear unduly repetitious. Duplicates of the spectators are preferably distributed throughout the spectator area so as to make the overall crowd appear diverse, even though the number of different 3D models and 2D imposters that need to be calculated and rendered within each display execution frame are limited. Thus, at a step 372, the computer graphics artist specifies locations throughout the sections of the spectator area for each of the different spectators. The artist also specifies a texture to be applied to the different types of spectators. For example, the artist may specify that a home jersey texture be applied to some of the spectators while a business suit or general casual clothes be applied as the texture used for other spectators. The artist also preferably specifies a color hue to be applied to the spectators at each specified location. For example, some spectators may be located near an overhead light, a glowing sign, or other light source that would cast a colored glow onto the spectators in that area.

Once the artist has specified how the crowd of spectators is to look, move, and be located, this information is stored in a crowd specification file, at a step 374. In addition to data specifying the 3D models, animation sequences, textures, and locations, the boundaries of each spectator section in the virtual arena are also stored in the crowd specification file.

Figure 7:
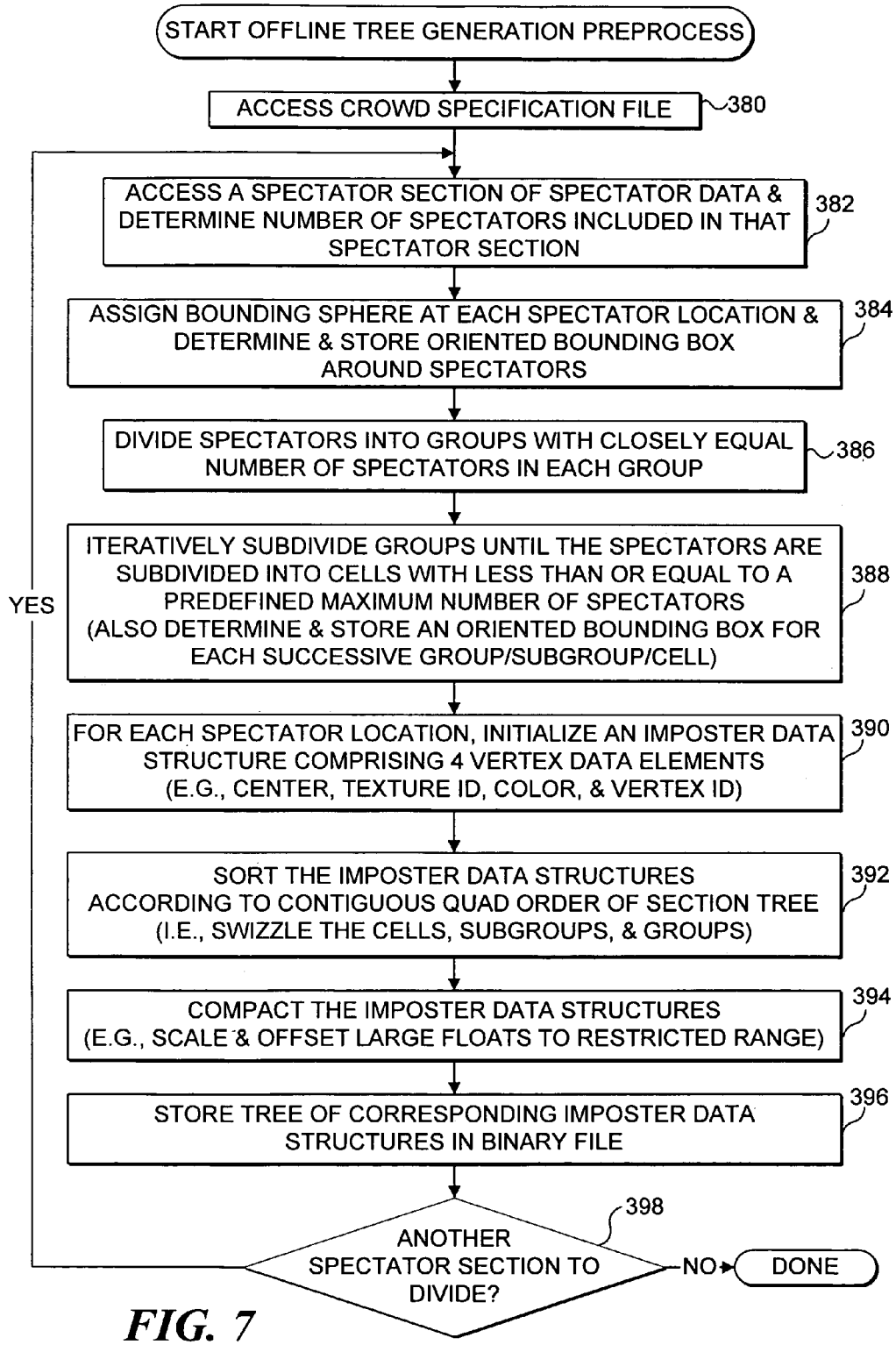
FIG. 7 is a flow diagram illustrating logic for generating the hierarchical data structure as a quad tree.

Based on the data specified by the artist and the sections comprising the spectator area, a hierarchical data structure is created offline to improve processing of the specification information during run-time. FIG. 7 is a flow diagram illustrating the logic for generating the hierarchical data structure as a quad tree. At a step 380, a preprocessing module accesses the crowd specification file. At a step 382, the preprocessing module accesses specification data that are associated with a single section of spectators. The preprocessing module also determines the number of spectators associated with that selected section. At a step 384, the preprocessing module determines a bounding sphere based on a radius needed to encompass the 3D model with the largest dimensions. The preprocessing module then assigns a copy of this bounding sphere to each spectator location in the selected section and determines an oriented bounding box that defines the minimum area rectangle that can enclose all of the bounding spheres for the selected section. The oriented bounding box will later be checked for intersection with the view volume during run-time to determine whether any spectators of a specific section are visible in the current view of the crowd. The oriented bounding box can be oriented differently than the section it represents, but defines the minimum volume required to encompass all the spectators of a section.

At a step 386, the preprocessing module divides the number of spectator locations of the selected section into two groups of substantially equal numbers. The preprocessing module associates each spectator location with its corresponding group and stores the associations as part of the tree. Similarly, at a step 388, the preprocessing module iteratively subdivides each group of spectator locations into four subgroups with approximately equal numbers of spectator locations, for a total of eight subgroups. Each spectator location is associated with its corresponding subgroup, and the association is stored as part of the tree. Again, the preprocessing module iteratively subdivides each subgroup into four further subgroups, each with substantially equal numbers of spectator locations. Each spectator location is thus associated with a number of different levels of groupings that encompass progressively smaller numbers of spectator locations. At each level of subdivision, the preprocessing module also determines and stores an oriented bounding box for each successively smaller subgroup, based on the bounding spheres discussed above. The subdividing process continues until a subdivided group of spectator locations is less than or equal to a predefined maximum number of spectator locations that define a smallest grouping of the spectator locations. This smallest grouping is referred to herein as a cell. A cell corresponds to a final leaf of the hierarchical tree.

At a step 390, the preprocessing module initializes an imposter data structure for each spectator location of the selected section. The imposter data structures will be used to store data that define 2D imposters. For example, an imposter data structure will comprise four vertex data elements corresponding to four vertices of a polygon that will be rendered to display a 2D imposter. Similarly, each imposter data structure includes elements for storing other data associated with an imposter, such as a unique vertex ID for each of the four vertices, a texture ID for the texture assigned to a particular spectator location, a color assigned to the particular spectator location, a center position associated with the particular spectator location, and other elements that hold data from the crowd specification file and data generated during run-time. For example, the exact coordinates of the polygon vertices will not be known until run-time, but the vertex data elements are predefined and initialized to the center position, so that only an offset need be calculated for each vertex during run-time. At a step 392, the preprocessing module sorts the imposter data structures according to the contiguous quad order defined by the hierarchical tree. In effect, the preprocessing module associates each imposter data structure with the group, subgroup(s), and cell that encompass the spectator location associated with the imposter data structure. This sorting is sometimes referred to as "swizzling." The "swizzled order" corresponds to the quad order illustrated in FIG. 5.

At a step 394 of FIG. 7, the preprocessing module compacts the imposter data structures and the current data to save storage space. For example, large floating point values can be scaled and offset to a restricted range to reduce the amount of memory needed to specify a data value. At a step 396, the preprocessing module stores the hierarchical tree of corresponding imposter data structures and data in a binary file. The preprocessing module then determines, at a decision step 398, whether another spectator section remains to be divided. If another spectator section needs to be processed, control returns to step 382 to access the data associated with the next spectator section. Once all spectator sections have been processed to create a hierarchical tree and corresponding imposter data structures for each section, the preprocessing stage is complete. Those skilled in the art will recognize that a single hierarchical tree could be created for the entire collection of spectator locations. This one hierarchical tree could divide all spectator locations into iteratively subdivided groups rather than relying on spectator sections predefined by the artist.

Figure 8:
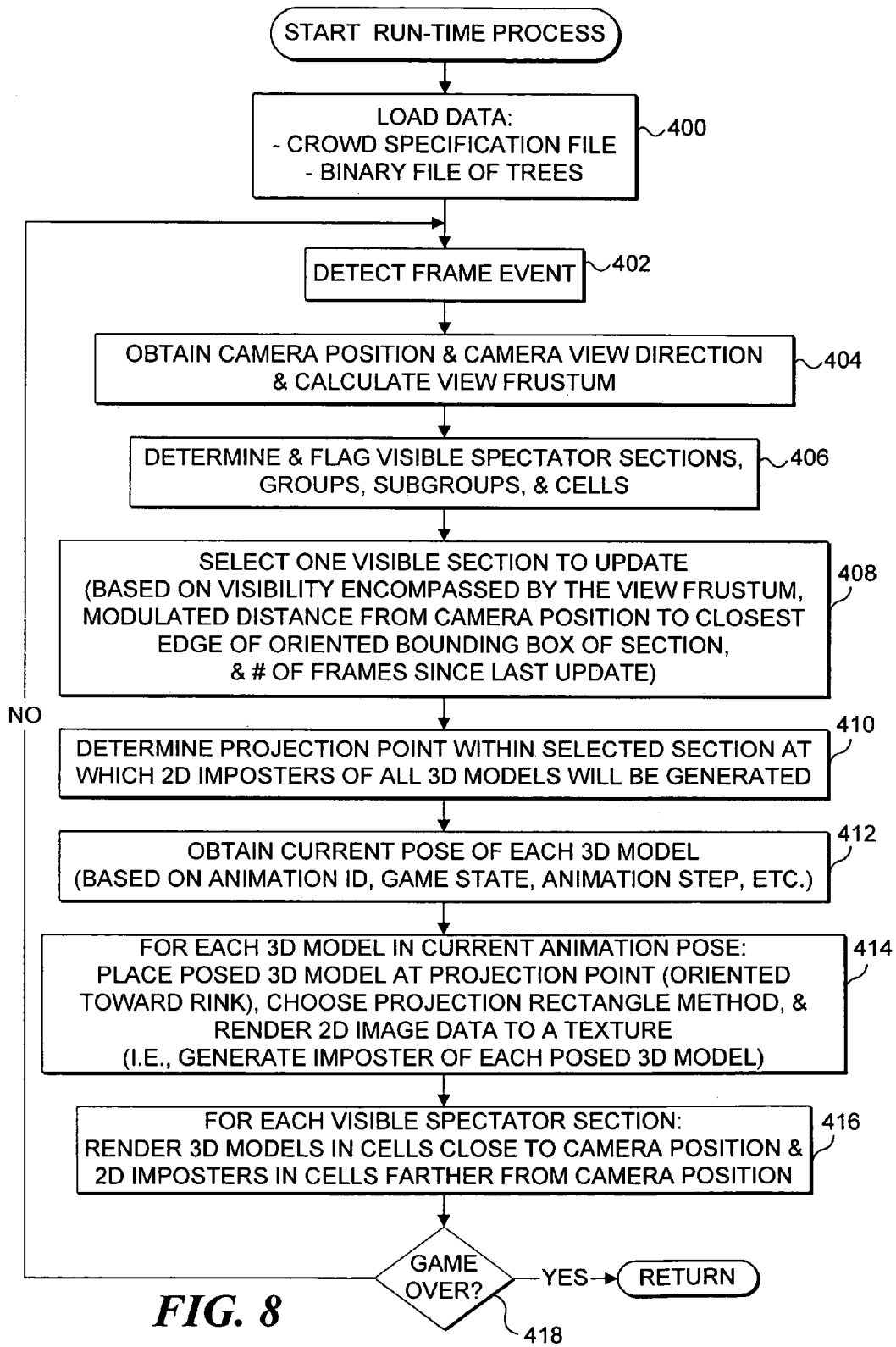
FIG. 8 is a flow diagram illustrating logic for rendering 2D imposters and 3D models of spectators during run-time execution of a game or other simulation.

FIG. 8 is a flow diagram illustrating the logic for rendering 2D imposters and 3D models of spectators during run-time execution of a game or other simulation. At a step 400, a run-time process loads data that were determined in the preprocessing stage described above. More specifically, the run-time process loads the crowd specification file and the binary file of hierarchical trees corresponding to the spectator sections. At a step 402, the run-time process detects a frame event, which indicates that an updated display frame needs to be generated. Preferably, the frame events occur at a rate of at least thirty frames per second to ensure that the animation appears relatively smooth. At a step 404, the run-time process obtains a current camera position and camera view direction for use in calculating a view volume such as a view frustum. Because display screens are generally rectangular, the view frustum is determined as a truncated pyramid. The run-time process then steps through the hierarchical trees to obtain oriented bounding box information about each group, subgroup, and cell. The run-time process checks for intersections between the view frustum and the oriented bounding boxes to determine and flag, at a step 406, those spectator sections, groups, subgroups, and cells that are currently visible.

At a step 408, the run-time process determines a modulated distance between the current camera position and the closest edge of each oriented bounding box for each visible spectator section. The modulated distance is preferably determined as a function of a current camera zoom factor, a predefined view range threshold, the area of a spectator section encompassed by the view frustum, and/or other factors that affect the current view of each spectator section. Based on the modulated distance determined for each spectator section, the run-time process selects one of the currently visible sections to be updated during the current frame. The selection is preferably a function of the area of a spectator section's bounding box encompassed within the view frustum, a number of frames that have been displayed since a particular spectator section has been updated, and/or other criteria for prioritizing the spectator sections.

Once a spectator section is selected, the run-time process determines a projection point, at a step 410, at which 2D imposters will be generated for all of the 3D models. Details regarding determination of the projection point are discussed below with regard to FIG. 9. At a step 412 of FIG. 8, the run-time process obtains a current animation pose of each 3D model. An animation pose of a 3D model corresponds to a step in an animation sequence that is associated with the 3D model. A current animation step depend on the current game state, e.g., responding to a game point that was just scored. For each 3D model in its current animation pose, the run-time process places the posed 3D model at the projection point, at a step 414, such that the posed 3D model is oriented generally facing toward the play area. While a posed 3D model is at the projection point, the run-time process renders 2D image data to a texture storage space, thereby generating a 2D imposter of each posed 3D model. The 2D imposter is generated relative to the current camera position, so the 2D imposter looks 3D, even though the 2D imposter is flat.

This projection process can be accomplished in various different ways, depending on whether the camera position is close to the spectator area or far from the spectator area, such as in the middle of the play area. If the camera position is close to the spectator area, each posed 3D model is projected onto a rectangle that is defined by the minimum dimensions needed to bound a particular posed 3D model. Thus, each 2D imposter will comprise a texture that is fit within a unique minimum rectangle needed to enclose the projection of an individual posed 3D model. Using individually sized rectangles minimizes the number of unused pixels in each 2D imposter texture. Minimizing unused pixels maximizes visual quality of each 2D imposter and reduces the amount of processor time required to render the 2D imposter. For this projection method, the rectangle is also aligned orthogonal to the camera view direction and corresponds to a near plane disposed at the point of the posed 3D model that is closest to the camera position. Although the above-described projection method provides visual accuracy benefits, the method requires processor time to determine a unique rectangle for each imposter during run-time. When the camera position is far from the spectator area, an alternative projection method can be used that does not require as much processing during run-time. Instead of computing a unique rectangle for each 2D imposter, the run-time process can compute a single rectangle based on the largest bounding sphere determined for the 3D models during the preprocessing stage. Using the largest bounding sphere will result in a larger dimensioned rectangle and more unused pixels, but eliminates the need to calculate a unique rectangle based on each uniquely posed 3D model within the time period of a single frame. Further detail regarding these two methods is provided in Appendix A. Those skilled in the art will recognize that other projection techniques can be used in the alternative.

Once a 2D imposter is generated from each posed 3D model, the run-time process renders 3D models at spectator locations that are close to the camera position (where detail is more important for realism) and renders 2D imposters at spectator locations that are farther from the current camera position, at a step 416. The rendering process is discussed below with regard to FIG. 13. At a decision step 418, the run-time process determines whether the game is over or if other changes in display processing have occurred that would prevent updating the display of the spectators. If such an interruption has occurred, the run-time process returns control to its parent process. Otherwise, control returns to step 402 to await detection of another frame event and the start of another cycle of updating the display of spectators.

Figure 9:
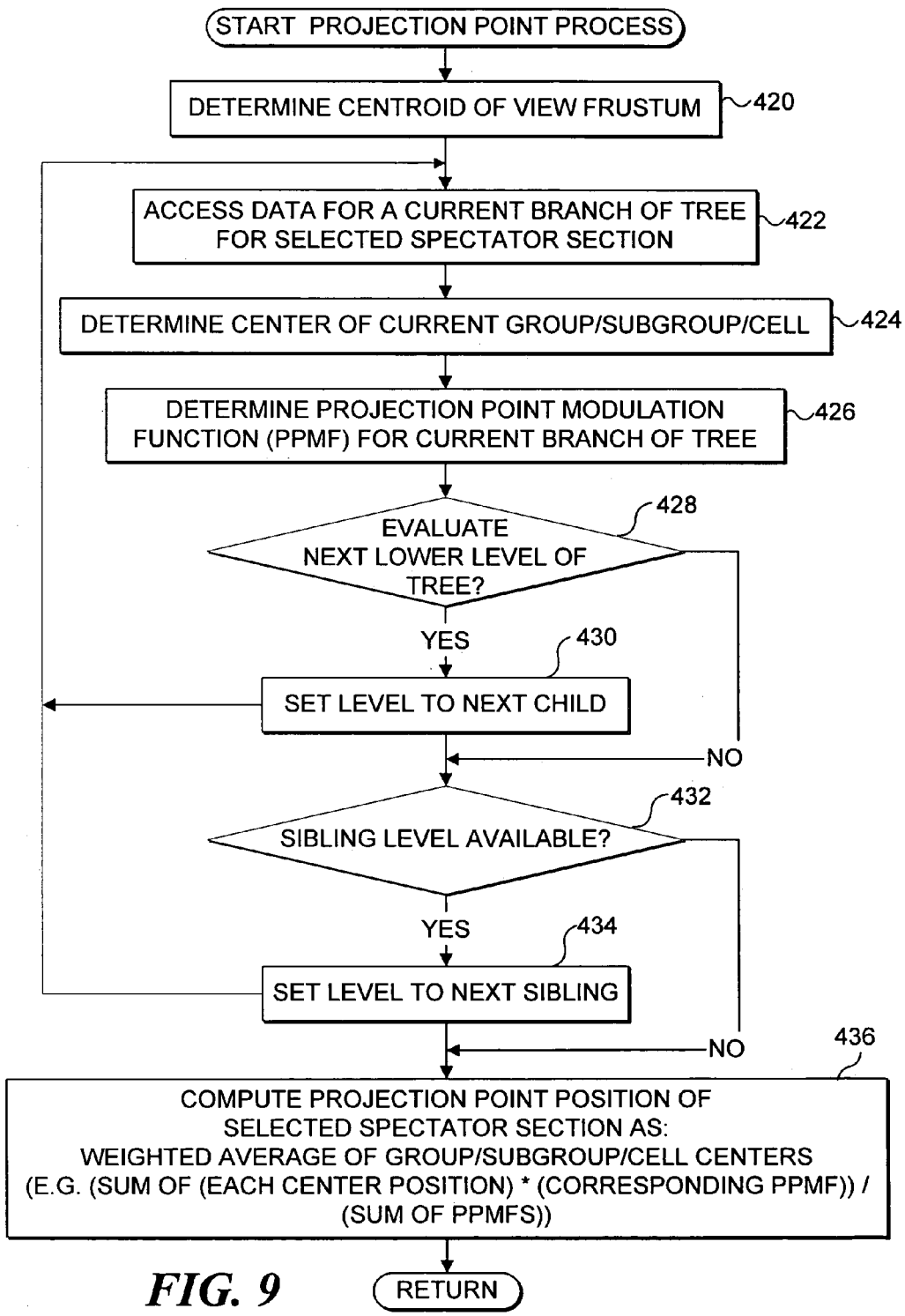
FIG. 9 is a flow diagram illustrating logic for determining a projection point at which 2D imposters are generated from posed 3D models.

Further detail of the logic employed regarding step 410 (in FIG. 8) is provided in FIG. 9. This logic determines the projection point at which 2D imposters are generated from posed 3D models. At a step 420, a projection point process determines a volumetric centroid of the view frustum. At a step 422, the projection point process begins traversing the hierarchical tree of the selected spectator section to access data related to the first level of the hierarchical tree. In particular, the projection point process accesses the spectator locations associated with a first level group of spectators. At a step 424, the projection point process uses the spectator locations of the current level group to determine a center of the group. This group center is preferably based on the spectator locations associated with the group and is not based on geometric dimensions of a subsection of the currently selected spectator section. Also, this group center preferably comprises a volumetric centroid, but is referred to herein as a group center to simplify the discussion. Based on this group center location, the projection point process determines a PPMF, at a step 426. Further detail regarding the PPMF is discussed below with regard to FIG. 10.

At a decision step 428 in FIG. 9, the projection point process determines whether a center and PPMF should be calculated for the next lower level of spectator subgroup(s). Further detail regarding this determination is discussed below with regard to FIG. 12. If the center and PPMF of the next lower subgroup(s) should be determined, the projection point process sets a current level variable to the next child of the hierarchical tree, at a step 430. This process step iterates until no lower level centers and PPMFs need to be determined. Once the lowest level of the current branch of the hierarchical tree has been evaluated, and the centers and PPMFs along that traversal path have been determined, at a decision step 432, the projection point process determines whether a sibling level group is available to evaluate. If so, the projection point process sets the current level to the next sibling group, at a step 434. Control then returns to step 422 to determine centers and PPMFs for the subgroups and cells of that next sibling group. Once all of the centers and PPMFs of the appropriate groups, subgroups, and cells have been determined, the projection point process computes the projection point position for the selected spectator section, at a step 436. The projection point position is computed as a weighted average of the centers determined for the groups, subgroups, and cells, wherein the weighted average is a function of the corresponding PPMFs. Specifically, the projection point position is computed as a sum of each center position multiplied by its corresponding PPMF, divided by a sum of the PPMFs.

Figure 10:
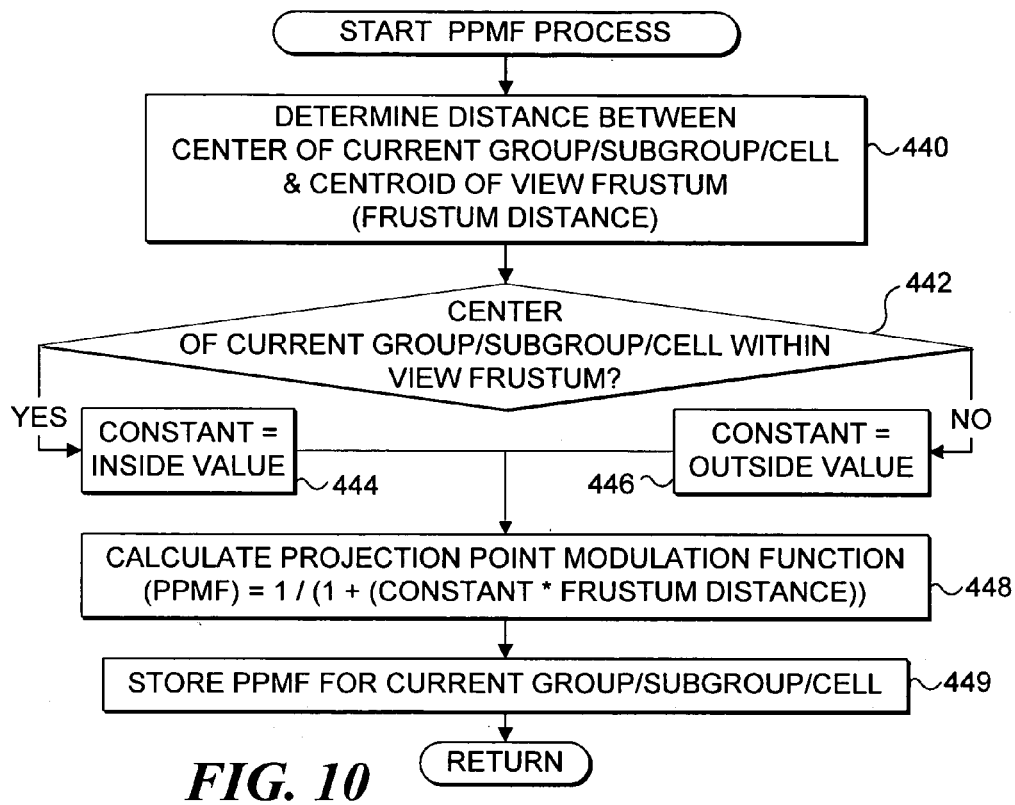
FIG. 10 is a flow diagram illustrating logic for determining a projection point modulation function (PPMF), used in determining the projection point.

FIG. 10 is a flow diagram illustrating the logic for determining a PPMF. At a step 440, the projection point process determines a distance between the center (i.e., centroid) of a current group, subgroup, or cell and the centroid of the view frustum. This distance is referred to herein as the frustum distance. At a decision step 442, the projection point process determines whether the center of the current group, subgroup, or cell is within the view frustum. If the view frustum encompasses the center of the current grouping of spectator locations, then the projection point process sets a constant to an inside value, at a step 444. The inside value represents the fact that the center of the current grouping is inside the view frustum. Conversely, if the center of the current grouping of spectator locations is not within the view frustum, the projection point process sets the constant to an outside value, at a step 446. Preferably, the outside value is less than the inside value. The inside and outside values for the constant are predetermined to control how quickly the PPMF goes to zero, thereby controlling how much a particular grouping of spectator locations influences the final determination of the projection point. At a step 448, the projection point process calculates the PPMF as the quotient of 1 divided by the sum of one and product of the constant times the frustum distance. Once calculated, the projection point process stores the PPMF for the current grouping, at a step 449.

FIG. 11 provides a graphical example for determining the projection point position. FIG. 11 is a top view of spectator section 0 356, and shows various levels of groupings of spectator locations within that spectator section. For example, a first level group 450b encompasses spectator locations in a right half of spectator section 0 356. As indicated above, the projection point process determines a group center 452b of group 450b based on the spectator locations within group 450b. The projection point process determines a distance between group center 452b and a view volume centroid 361, which is preferably the centroid of the view frustum illustrated by view volume 360. The projection point process also determines whether group center 452b lies within the view frustum, and determines a projection point modulation function to be associated with group center 452b. The relative value of the PPMF determined for group center 452b is illustrated by the size of the cross mark of group center 452b. A similar process is performed to determine a PPMF for a left group center 452a of a left-half group 450a. Because left group center 452a is closer to view volume centroid 361 and is within view volume 360, the PPMF for left group center 452a is larger, as illustrated by the larger cross mark of left group center 452a.

Once the group level PPMFs are computed, the projection point process determines whether a group should be subdivided into subgroups to determine PPMFs for centers of the subgroups. In the example of FIG. 11, right group center 452b is relatively far from view volume centroid 361 and camera position 358. Thus, right group 450b should have less effect on determining a final projection point position 460 than centers associated with subgroups and cells of left group 450a. Accordingly, lower level subdivisions of right group 450b are not evaluated through the hierarchical tree branches associated with right group 450b.

However, the subdivision levels of left group 450a are evaluated. In particular, four subgroups of left group 450a are evaluated to determine corresponding centers and PPMFs. For instance, the spectator locations of a subgroup 453b are evaluated to determine a subgroup center 454b. A corresponding PPMF is determined for subgroup center 454b based on the distance between subgroup center 454b and view volume centroid 361. The PPMF value determined for subgroup center 454b can also depend on its level in the hierarchical tree structure. For example, the constant used for calculating the PPMF can be selected or modified based on each level of subgrouping in the hierarchical tree structure. However, the distance between a subgrouping center and the view volume centroid and/or the camera position preferably has the greatest influence on the PPMF determined for a particular grouping center. Other subgroup centers that affect projection point position 460 include subgroup center 454d and subgroup center 454c. Note that subgroup center 454c is closer to camera position 358, and therefore, has a greater influence on projection point position 460 than the other centers. Recall that the centroid of the view volume can be determined as a modulated centroid based on zoom, field of view, and other characteristics. Thus, view volume centroid 361 can be a modulated view volume centroid, so that calculation of PPMFs would depend primarily on the distance between each grouping center and the modulated view volume centroid and corresponding constant. Regardless of which way the PPMF is calculated, a close grouping center, such as subgroup center 454c will have a larger PPMF, resulting in a larger influence on the final projection point position.

Similarly, close cell centers will have a large influence on determining projection point position 460. For example, cell centers 456b and 456d will have a large influence on determining projection point position 460, since these cell centers are close to camera position 358, are close to view volume centroid 361, and are within view volume 360. Conversely, cell center 456a will have less influence, because it is outside of view volume 360 and farther from view volume centroid 361, even though cell center 456a is relatively close to camera position 358. Accordingly, the PPMF of cell center 456a is illustrated by a smaller cross mark. Similarly, cell centers 458b, 458c, and 458d will have correspondingly less influence on determining projection point position 460.

FIG. 12 is a flow diagram illustrating logic for determining whether to evaluate a next lower level of groupings to determine more centers and corresponding PPMFs. At a step 462, the projection point process determines a distance between the current camera position and the center (i.e., centroid) of a current group, subgroup, or cell. This distance is referred to herein as the camera distance. At a decision step 464, the projection point process determines whether the current grouping is visible. Preferably, visibility is determined by whether the oriented bounding box of the current grouping intersects the view volume (i.e., the view frustum). As indicated above, the view volume is preferably simplified to a frustum of a pyramid to simplify the calculations. If the current grouping is visible, the projection point process determines a field of view modulation factor (FOVMF) for the current grouping, at a step 466. The FOVMF is preferably determined as a function of the zoom, field of view, and other relevant view factors. If the current grouping is not visible, the projection point process sets the FOVMF equal to 1, at a step 468, so that the camera distance is not modified.

After the FOVMF is determined, the projection point process multiplies the camera distance by the FOVMF, at a step 470 to create a modulated camera distance (MCD). At a step 472, the projection point process then determines a quotient from dividing the MCD by a length of the longest axis of the current grouping. In the examples illustrated in FIG. 11 and discussed above, the groupings generally appear square. However, those skilled in the art will recognize that the groupings need not be square because the groupings are dependent on the spectator locations and not on geometric subdivisions of a section. Thus, the axes of a grouping may not be equal. At a step 474, the projection point process accesses a predefined threshold value associated with a current level of the hierarchical tree. Based on the predefined threshold value and the calculated quotient, the projection point process determines, at a decision step 476, whether the quotient is less than the predefined threshold value. If the quotient is less than the predefined threshold value, the projection point process sets a decision flag, at a step 478, to indicate that the projection point process should evaluate the next lower level of groupings for centers and corresponding PPMFs. However, if the quotient is greater than (or equal to) the predefined threshold value, the projection point process does not set the flag to evaluate a next level, as illustrated by a step 480. Control then returns to decision step 428 of FIG. 9 to check the decision flag and continue processing the logic of FIG. 9 to ultimately compute the projection point position.

Once the projection point position is determined, and the 2D imposters are generated at the projection point position, the run-time process can begin rendering the 3D models and the 2D imposters. FIG. 13 is a flow diagram illustrating the logic for rendering the 3D models and 2D imposters of the visible spectator sections. At a decision step 500, the run-time process determines whether a particular spectator section is at least partially visible. Preferably, this determination is based on whether a spectator section's bounding box intersects the view frustum. If a particular spectator section is visible, the run-time process determines, at a step 502, which corresponding groups, subgroups, and/or cells of the spectator section are located within a predefined modulated radius from the current camera position. The modulated radius is similar to previously discussed modulated distances in that the modulated radius is based on the current zoom, field of view, and other view factors. Those groupings that are within the predefined modulated radius are rendered with 3D models to provide greater realism at close range. These close groupings are sometimes referred to herein as 3D groupings.

At a step 504, the run-time process determines the 2D groupings are contiguous based on the current camera position. For example, as discussed above with regard to FIG. 5, sets 364 and 368 comprise contiguous cells separated by cell 10 366, which will be rendered with 3D models. Recall that the contiguous sets of 2D imposters will be rendered with one draw primitive per set.

Having determined where 3D models and 2D imposters will be rendered, the run-time process sorts the visible 3D groupings, in a step 506, in order from those groupings that are closest to the camera position to those groupings that are furthest from the camera position. In the example of FIG. 5, only cell 10 366 is within the predefined modulated radius from the camera position, so the sorting does not have much effect. At a step 508, the run-time process then renders the 3D models of the visible 3D groupings.

In a similar fashion, the run-time process sorts the sets of visible 2D groupings, at a step 510, starting from the set that is closest to the camera position to the set that is furthest from the camera position. In the example of FIG. 5, set 364 would be considered to come before set 368, because set 364 includes two cells that are very close to the camera position, whereas set 368 has only one cell that is similarly close to the camera position.

At a step 512, the run-time process calls a draw primitive function for each set of 2D groupings. The draw primitive function preferably invokes a vertex shader to calculate vertex position values associated with each spectator location, thereby defining polygons that are oriented orthogonal to the view direction from the current camera position to the projection point position. Exemplary vertex shader code is provided in Appendix B. In general, the vertex shader calculates a unique offset from the spectator location to each vertex of the polygon on which a 2D imposter texture will be rendered. A sample of the vertex calculation is also provided in Appendix B. Those skilled in the art will recognize that other methods can be used to calculate the vertices. Having defined the position and orientation of the polygons for the 2D imposters, the draw primitive function also invokes a pixel shader to render the specified 2D imposter texture of the corresponding posed 3D model at each spectator location in each set of groupings. Another call to the draw primitive function renders all 2D imposters for each successive set, until all of the sets are rendered.

At a decision step 514, the run-time process determines whether another spectator section is available for processing. If so, control returns to decision step 500 to determine whether the next spectator section is visible and needs to be rendered. If a spectator section is not visible, control is passed back to decision step 514, and the logic continues to loop until all visible spectator sections are rendered for the current display frame. The run-time process then awaits the next frame event to update and again render the display of spectators.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention claimed is:

1. A method for dynamically displaying two-dimensional (2D) imposters representing three-dimensional (3D) graphical objects, relative to an arbitrarily movable camera position, wherein each 2D imposter comprises a projection of one of the 3D graphical objects, comprising the steps of:
   (a) predefining locations within a virtual space, wherein each location defines a position at which one of:
      (i) a 3D graphical object will be displayed; and
      (ii) a 2D imposter will be displayed;
   (b) predefining a hierarchical data structure comprising hierarchical groups of imposter data structures to be used in defining the 2D imposters, wherein each imposter data structure is associated with one of the predefined locations within the virtual space, and wherein the hierarchical groups are arranged in a contiguous quad order;
   (c) determining a current camera view volume within the virtual space;
   (d) determining a common projection location within the current camera view volume as a function of a central location of the predefined locations associated with each hierarchical group of imposter data structures;
   (e) generating each of the 2D imposters as a projection of each 3D graphical object positioned at the common projection location within the current camera view volume;
   (f) determining 2D imposter locations within the current camera view volume at which 2D imposters will be displayed, the 2D imposter locations being determined as a function of a modulated distance from a current camera position;
   (g) forming contiguous sets of imposter data structures associated with predefined locations that are not interrupted by one of:
      (i) locations at which 3D graphical objects will be rendered; and
      (ii) locations that are outside the view volume; and
   (h) invoking a single draw primitive for each contiguous set of imposter data structures to render 2D imposters for each contiguous set of imposter data structures, thereby displaying 2D imposters at the predefined locations.

2. The method of claim 1, wherein the 3D graphical objects comprise virtual spectators in a virtual arena.

3. The method of claim 1, wherein the step of predefining the hierarchical data structure comprises the steps of:
   (a) iteratively dividing the predefined locations into a plurality of levels of groups, wherein the groups at each level comprise substantially equal numbers of predefined locations; and
   (b) arranging plurality of levels of groups in a contiguous quad order.

4. The method of claim 1 wherein an individual imposter data structure comprises:
   (a) one of the predefined locations within the virtual space;
   (b) a plurality of vertex data elements, wherein each vertex data element is assigned a unique vertex identifier; and
   (c) a texture identifier specifying a texture associated with the individual imposter data structure.

5. The method of claim 1, wherein the step of determining a common projection location comprises the steps of:
   (a) determining a plurality of group centers, each group center comprising a center location of each hierarchical group that is within a predefined distance of a current camera location;
   (b) determining a plurality of modulation functions, each modulation function corresponding to each group center as a function of at least:
      (i) the distance between a group center and a centroid of the camera view volume; and
      (ii) whether a group center is within the camera view volume; and
   (c) computing a weighted average of the group centers as a function of a sum of the group centers and a sum of the modulation functions.

6. The method of claim 1, wherein the step of generating each of the 2D imposters comprises the steps of:
   (a) determining a current animation step associated with each of the 3D graphical objects;
   (b) generating a posed 3D graphical object for each of the 3D graphical objects as a function of the current animation step associated with each of the 3D graphical objects; and
   (c) generating a projected image of each posed 3D graphical object positioned at the common projection location.

7. The method of claim 6, further comprising the step of defining a rectangle size for the projected image as a function of a proximity of the current camera position to the predefined locations.

8. The method of claim 1, wherein the step of determining 2D imposter locations comprises the steps of:
   (a) determining the modulated distance from the current camera position as a function of a predefined radius and at least a current zoom factor; and
   (b) selecting predefined locations that are within the modulated distance from the current camera position and are within the camera view volume.

9. The method of claim 1, wherein the step of forming contiguous sets of imposter data structures comprises the steps of:
   (a) determining visible hierarchical groups from the hierarchical groups of imposter data structures that include at least one predefined location within the camera view volume;
   (b) determining any 3D hierarchical group from the visible hierarchical groups that include at least one predefined location within a predefined 3D threshold distance from the current camera position, thereby determining the visible hierarchical groups that will be rendered with 3D graphical objects rather than 2D imposters; and (c) selecting the visible hierarchical groups that include adjacent imposter data structures not interrupted by a 3D hierarchical group.

10. The method of claim 1, wherein prior to the step of invoking a single draw primitive, further comprising the steps of:

(a) sorting the contiguous sets of imposter data structures into an order, from a contiguous set that is closest to the current camera position, to a contiguous set that is farthest from the current camera position; and (b) rendering 3D graphical objects at predefined locations that are within the camera view volume and are associated with hierarchical groups that are within a predefined distance from the current camera position.

11. A memory medium on which are stored machine instructions for carrying out the steps of claim 1.

12. A system for dynamically displaying two-dimensional (2D) imposters of three-dimensional (3D) graphical objects relative to an arbitrarily movable camera position, wherein each 2D imposter comprises a projection of one of the 3D graphical objects, comprising:

(a) a processor;

(b) a display in communication with the processor; and (c) a memory in communication with the processor, the memory storing machine instructions that cause the processor to carry out a plurality of functions, including:

(i) predefining locations within a virtual space, wherein each location defines a position at which one of:
(1) a 3D graphical object will be displayed; and
(2) a 2D imposter will be displayed;

(ii) predefining a hierarchical data structure comprising hierarchical groups of imposter data structures to be used in defining the 2D imposters, wherein each one imposter data structure is associated with one of the predefined locations within the virtual space, and wherein the hierarchical groups are arranged in a contiguous quad order;

(iii) determining a current camera view volume within the virtual space;

(iv) determining a common projection location within the current camera view volume as a function of a central location of the predefined locations associated with each hierarchical group of imposter data structures;

(v) generating each of the 2D imposters as a projection of each 3D graphical object positioned at the common projection location within the current camera view volume;

(vi) determining 2D imposter locations within the current camera view volume at which 2D imposters will be displayed, the 2D imposter locations determined as a function of a modulated distance from a current camera position;

(vii) forming contiguous sets of imposter data structures associated with predefined locations that are not interrupted by one of:
(1) locations at which 3D graphical objects will be rendered; and
(2) locations that are outside the view volume; and (viii) invoking a single draw primitive for each contiguous set of imposter data structures to render 2D imposters for each contiguous set of imposter data structures, thereby displaying 2D imposters at the predefined locations that are not interrupted by locations at which 3D graphical objects will be rendered.

13. The system of claim 12, wherein the 3D graphical objects comprise virtual spectators in a virtual arena.

14. The system of claim 12, wherein the machine instructions further cause the processor to carry out the functions of:

(a) iteratively dividing the predefined locations into a plurality of levels of groups, wherein the groups at each level comprise substantially equal numbers of predefined locations; and (b) arranging plurality of levels of groups in a contiguous quad order.

15. The system of claim 12, wherein an individual imposter data structure comprises:

(a) one of the predefined locations within the virtual space;

(b) a plurality of vertex data elements, wherein each vertex data element is assigned a unique vertex identifier; and (c) a texture identifier specifying a texture associated with the individual imposter data structure.

16. The system of claim 12, wherein the machine instructions further cause the processor to carry out the functions of:

(a) determining a plurality of group centers, each group center comprising a center location of each hierarchical group that is within a predefined distance of a current camera location;

(b) determining a plurality of modulation functions, each modulation function corresponding to each group center as a function of at least:
(i) the distance between a group center and a centroid of the camera view volume; and
(ii) whether a group center is within the camera view volume; and (c) computing a weighted average of the group centers as a function of a sum of the group centers and a sum of the modulation functions.

17. The system of claim 12, wherein the machine instructions further cause the processor to carry out the functions of:

(a) determining a current animation step associated with each of the 3D graphical objects;

(b) generating a posed 3D graphical object for each of the 3D graphical objects as a function of the current animation step associated with each of the 3D graphical objects; and (c) generating a projected image of each posed 3D graphical object positioned at the common projection location.

18. The system of claim 12, wherein the machine instructions further cause the processor to carry out the functions of:

(a) determining the modulated distance from the current camera position as a function of a predefined radius and at least a current zoom factor; and (b) selecting predefined locations that are within the modulated distance from the current camera position and are within the camera view volume.

19. The system of claim 12, wherein the machine instructions further cause the processor to carry out the functions of:

(a) determining visible hierarchical groups from the hierarchical groups of imposter data structures that include at least one predefined location within the camera view volume;
(b) determining any 3D hierarchical group from the visible hierarchical groups that include at least one predefined location within a predefined 3D threshold distance from the current camera position, thereby determining the visible hierarchical groups that will be rendered with 3D graphical objects rather than 2D imposters; and
(c) selecting the visible hierarchical groups that include adjacent imposter data structures not interrupted by a 3D hierarchical group.

20. The system of claim 12, wherein the machine instructions further cause the processor to carry out the functions of:
(a) sorting the contiguous sets of imposter data structures into an order, from a contiguous set that is closest to the current camera position, to a contiguous set that is farthest from the current camera position; and
(b) rendering 3D graphical objects at predefined locations that are within the camera view volume and are associated with hierarchical groups that are within a predefined distance from the current camera position.

* * * * *